Feb. 2, 1937.  F. S. GUSSICK  2,069,364
VALVE
Filed March 11, 1935   2 Sheets-Sheet 1

Inventor
Frank S. Gussick

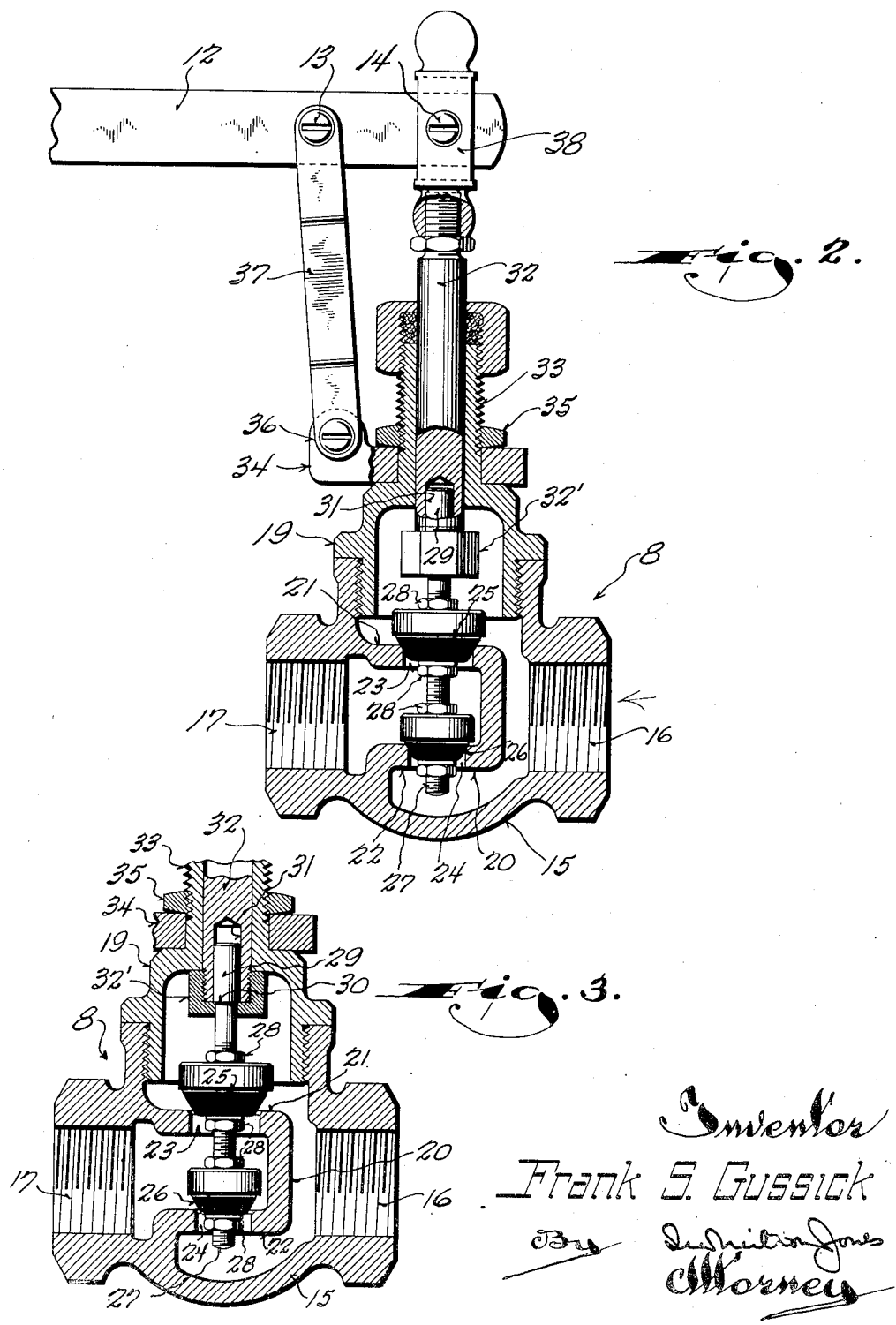

Patented Feb. 2, 1937

2,069,364

UNITED STATES PATENT OFFICE 2,069,364

VALVE

Frank S. Gussick, Milwaukee, Wis.

Application March 11, 1935, Serial No. 10,424

1 Claim. (Cl. 251—81)

This invention relates to valves and has as an object to provide an improved valve for controlling the passage of fluid under pressure on movement of a slow moving actuator such as a float.

In valves heretofore provided for this purpose, difficulty has always been experienced in preventing leakage. In these past constructions, the movable valve element traveled in direct accordance with the float or other actuator so that at the application of the initial opening force upon the valve element, the valve element was lifted an infinitesimal distance from its seat. Immediately upon the "cracking" of the valve in this manner, "wire drawing" seepage occurred between the element and its seat, so that slight particles of foreign matter carried in suspension had an exceptionally destructive abrasive action upon the valve element and its seat.

This led to the adoption of hard surfaced valves and hardened valve seats, but even with this expensive expedient leakage could not be prevented as the "wire drawing" seepage incidental to the slight initial opening of the valve eventually cut into even such hardened surfaces.

To overcome this deficiency of past valve constructions, this invention has as an object to provide a valve which is opened wide immediately upon the initial opening thereof so that the pernicious effect of "wire drawing" seepage through a slightly opened valve is entirely eliminated.

Another object of this invention is to provide a valve which permits the use of soft live rubber for the valve plug or disc so that in the event foreign particles do become lodged between the valve and its seat, the valve can close without injury to the disc or its seat.

A further object of this invention is to provide a valve for the purpose described which is so constructed that replacement of the movable valve element when found necessary is a simple matter.

With the above and other objects in view which will appear as the description proceeds, this invention resides in the novel construction, combination and arrangement of parts substantially as hereinafter described and more particularly defined by the appended claim, it being understood that such changes in the precise embodiment of the herein disclosed invention may be made as come within the scope of the claim.

The accompanying drawings illustrate one complete example of the physical embodiment of the invention constructed according to the best mode so far devised for the practical application of the principles thereof, and in which:

Figure 2 is a view partly in elevation and partly in section through the valve showing the same closed;

Figure 3 is a section view through the valve showing the parts in their positions of initial opening.

Figure 1:
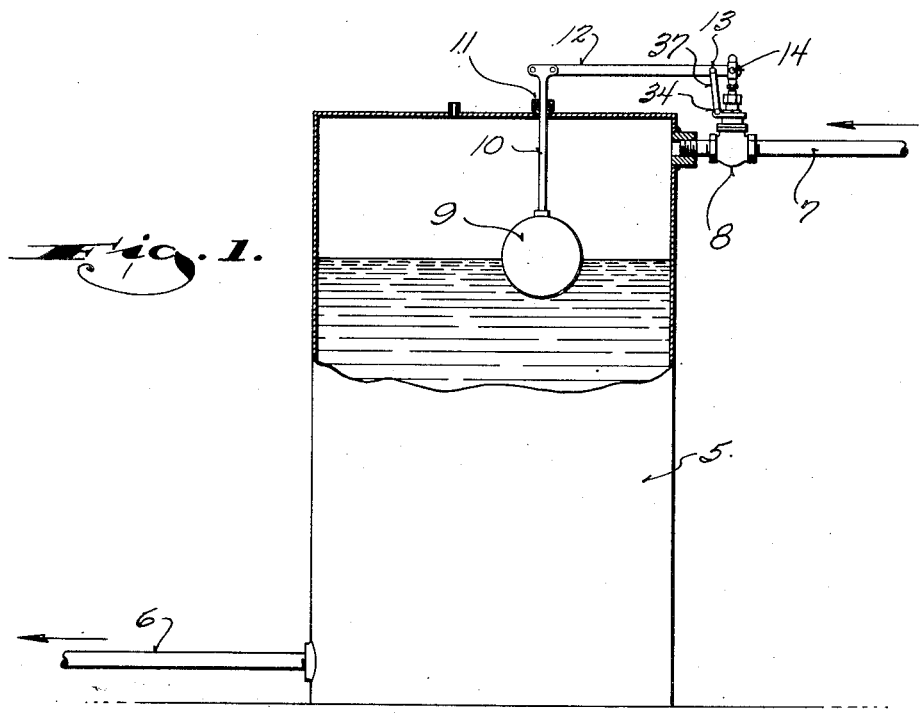
Figure 1 is a view showing one manner of using the valve of this invention.
Figure 4:
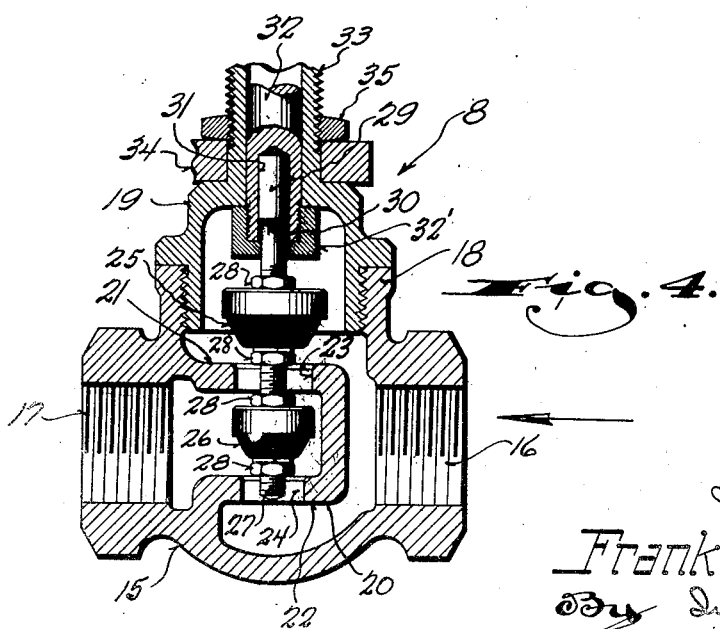
Figure 4 is a view similar to Figure 3 showing the valve fully open.

Referring now more particularly to the accompanying drawings in which like numerals indicate like parts throughout the several views, the numeral 5 designates a tank in which water is to be held to a predetermined level. The tank is equipped with an outlet pipe 6 and an inlet pipe 7, and to control the admission of water to the tank, the valve of this invention, generally designated by the numeral 8, is interposed in the inlet pipe, as shown.

The valve 8 is opened and closed on movement of a float 9. A float rod 10 extends up from the float through a packing gland 11 to be connected to one end of a lever 12. The lever 12 is pivotally mounted as at 13 and has its opposite end connected with the actuating stem of the valve as at 14. Rising of the float effects closure of the valve and descent of the float opens the valve.

The valve is of the globe type and comprises a T-shaped body 15 having tapped inlet and outlet openings 16 and 17, respectively, and a central branch tapped to receive a bonnet 19. Between the inlet and outlet, the body 15 is provided with a partition 20 which in longitudinal section is substantially U-shaped with the closed end of the U facing the inlet and the open end thereof facing and communicating with the outlet.

In line with the axis of the bonnet 19, the upper and lower walls 21 and 22, respectively, of the U-shaped partition are bored to provide ports 23 and 24, respectively. The upper peripheral edges of these bores are chamfered to form seats for valve plugs or discs 25 and 26, respectively.

The bore 23 and its associated plug 25 are of larger diameter than the bore 24 and plug 26 for a purpose to be hereinafter described.

Both valve plugs 25 and 26 are mounted on a common stem 27 which is threaded from its lower end to a point above the top of the upper plug or disc 25. Clamping nuts 28 disposed above and beneath each valve plug secure the same to the stem. The distance between the valve plugs thus may be readily adjusted to correspond to the spacing between the valve seats.

The upper end portion 29 of the stem 27 is larger in diameter than the stem proper to provide an abrupt shoulder 30. This large diameter portion 29 is slidably received in an axial bore 31 in the lower end of an actuating stem 32 slidable axially in a tubular extension 33 on the bonnet 19. Threaded to the lower end of the actuating stem 32 is a cap nut 32' bored to accommodate the valve stem 27.

The inner face of the cap nut 32' provides a surface against which the shoulder 30 abuts to limit the relative movement between the valve stem 27 and the actuating stem 32 in an outward direction, and it is to be observed that the bore 31 is deeper than the length of the large diameter portion 29 so that the valve stem has a degree of relative axial movement with respect to the actuating stem 32.

Leakage through the tubular extension 33 past the actuating stem 32 is prevented by a conventional packing gland including a nut threaded on the tubular extension. The tubular extension also provides convenient means for mounting a support 34 for the pivot 13. The support 34 is in the form of a collar positioned over the tubular extension of the bonnet and seated down on the top of the bonnet per se where it is held by a clamping nut 35. At one side, the collar has a radially projecting ear 36 to which a link 37 is pivoted. The upper end of the link is pivotally connected to the lever 12 to provide the pivotal support for the lever.

The connecton 14 between the lever 12 and the actuating stem 32 preferably, although not necessarily, includes a terminal member 38 fixed to the upper end of the actuating stem and slotted to accommodate the adjacent end of the lever 12.

Operation

Assuming that the valve is closed, as shown in Figure 2, it will be held thus by the fluid pressure at the inlet side by virtue of the fact that the upper valve plug 25 and the port closed thereby are larger in diameter than the lower valve plug and its respective port. With the valve in this position and the float in its uppermost position, the actuating stem 32 is in its lowermost position of vertical travel so that the lost motion between the actuating stem and the valve stem is all taken up in a downward direction. As the float begins to descend, the actuating stem 32 is lifted, but the upward travel of the actuating stem does not affect the movable valve element until the lost motion between the actuating stem and the valve stem is entirely taken up.

When the lost motion is taken up and the nut 32' engages the shoulder 30, continued descent of the float lifts the valve plugs off of their seats. Immediately upon the breaking of the seal between the valve plugs and their seats, the pressure at the inlet of the valve is no longer effective upon the upper valve plug to hold the same closed so that this pressure acting upon the lower valve plug lifts the movable valve element a distance determined by the amount of lost motion between the actuating stem and the valve stem. This distance is sufficient to open the valve wide.

The slight downward movement which the movable valve element makes in response to fluid pressure after the upper and larger plug approaches sufficiently close to its seat to enable the fluid pressure to take effect thereon, is permitted by the lost motion between the actuating stem and the valve stem.

It is thus evident that at no time is the valve held in a slightly open position, for during opening of the valve, the lost motion connection allows the fluid pressure to move the valve element instantaneously to a wide open position and in closing, the lost motion permits the valve element to be firmly closed by fluid pressure upon being moved close enough to closed position.

As will be readily apparent to those skilled in the art, the valve of this invention has many advantages. Besides entirely obviating the possibility of having the valve held in a slightly open position, the complete and instantaneous opening of the valve also insures clean valve seats and valve plugs. To illustrate, if during the closure of the valve, a particle of foreign matter is accidentally lodged between the plug and its seat, while this may result in a slight leakage, such foreign particles will be washed away upon the next opening of the valve inasmuch as a sufficient volume of water will be present to carry the same off of the seat.

Another advantage arising from this construction is the fact that it allows the use of soft live rubber valve plugs which automatically seat themselves and require no expensive grinding or fitting.

Another very important advantage of this construction is the ease with which the valve plugs may be replaced when necessary. To do this it is only necessary to remove the bonnet and loosen the cap nut 32' whereupon the entire valve plug assembly may be removed and another substituted therefor. The entire operation requires but a few minutes and can be done by anyone.

What I claim as my invention is:

In a valve of the character described, a substantially T-shaped body having an inlet and an outlet at opposite ends of the head of the T, a partition between the inlet and outlet forming a hollow chamber which has open communication with the outlet and is closed to the inlet except through superimposed ports in superimposed walls of the chamber, said ports being axially aligned with the stem of the T and the port nearest the stem being larger than the other port, a bonnet secured in the stem of the body to close the same, a valve element having spaced plugs corresponding in size to the small and large ports and joined so as to simultaneously close both ports, said valve element moving towards the bonnet in opening so that fluid pressure acting on the large plug holds the valve element closed against the same pressure acting upon the small plug whereby the valve element is held closed as long as the seal of closure is maintained, an actuator slidable axially through the bonnet for moving the valve element from outside the body, and a lost motion connection between the valve element and the actuator allowing a degree of relative motion therebetween so as to enable quick and full opening movement of the valve element upon initial breaking of the seal of closure and positive closing motion of the valve element independently of the actuator during the final stage of closure.

FRANK S. GUSSICK.